(12) United States Patent
Min (10) Patent No.: US 11,039,071 B2
(45) Date of Patent: Jun. 15, 2021

(54) CAMERA MODULE AND PORTABLE ELECTRONIC DEVICE

(71) Applicant: Samsung Electro-Mechanics Co., Ltd., Suwon-si (KR)

(72) Inventor: Kyoung Joong Min, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 1 day.

(21) Appl. No.: 16/514,445

(22) Filed: Jul. 17, 2019

(65) Prior Publication Data

US 2020/0120283 A1 Apr. 16, 2020

(30) Foreign Application Priority Data

Oct. 12, 2018 (KR) .................. 10-2018-0121709

(51) Int. Cl.
*H04N 5/232* (2006.01)
*G02B 7/02* (2021.01)
(Continued)

(52) U.S. Cl.
CPC ......... *H04N 5/23287* (2013.01); *G02B 7/023* (2013.01); *G02B 7/08* (2013.01);
(Continued)

(58) Field of Classification Search
CPC ........... H04N 5/23287; H04N 5/23258; H04N 5/2257; H04N 5/2254; H04N 5/2258; H04N 5/23248–2329; G02B 7/023; G02B 7/08; G02B 13/001; G02B 27/646; G03B 2205/0053; G03B 5/00; G03B 2205/0007–0038; G03B 2207/005; G03B 2217/005; G06T 7/38
See application file for complete search history.

(56) References Cited

U.S. PATENT DOCUMENTS 5,659,807 A * 8/1997 Nakamura ............... G03B 5/00
396/301
5,721,968 A * 2/1998 Iwane ...................... G03B 5/04
396/303

(Continued)

FOREIGN PATENT DOCUMENTS

JP           5784241 B2    9/2015
KR      10-0819301 B1    4/2008
KR  10-2013-0077216 A    7/2013

*Primary Examiner* — Abdelaaziz Tissire
(74) *Attorney, Agent, or Firm* — NSIP Law (57) ABSTRACT

A camera module includes a gyro sensor configured to generate a gyro signal, an optical image stabilization (OIS) controller configured to generate, in response to the gyro signal, a driving signal indicating target positions in first and second directions perpendicular to an optical axis of a lens barrel, a first OIS driver configured to detect a present position of the lens barrel in the first direction, and based on the detected present position in the first direction and the indicated target position in the first direction, provide a driving force to the lens barrel in the first direction, and a second OIS driver configured to detect a present position of the lens barrel in the second direction, and based on the detected present position in the second direction and the indicated target position in the second direction, provide a driving force to the lens barrel in the second direction.

18 Claims, 7 Drawing Sheets

(51) Int. Cl.
   *H04N 5/225* (2006.01)
   *G02B 7/08* (2021.01)
   *G02B 13/00* (2006.01)

(52) U.S. Cl.
   CPC ......... *G02B 13/001* (2013.01); *H04N 5/2257* (2013.01); *H04N 5/23258* (2013.01); *G03B 2205/0053* (2013.01)

(56) References Cited

U.S. PATENT DOCUMENTS

| | | | | |
|---|---|---|---|---|
| 10,382,687 | B1* | 8/2019 | Patel | G02B 27/64 |
| 2001/0012074 | A1* | 8/2001 | Ohkawara | H04N 5/23212 348/240.3 |
| 2006/0285840 | A1* | 12/2006 | Takahashi | G02B 27/646 396/55 |
| 2008/0031605 | A1* | 2/2008 | Akada | G02B 27/646 396/55 |
| 2008/0152332 | A1 | 6/2008 | Koo et al. | |
| 2009/0262425 | A1* | 10/2009 | Kimura | G03B 5/00 359/557 |
| 2011/0013896 | A1* | 1/2011 | Kawahara | G02B 27/64 396/55 |
| 2013/0077945 | A1* | 3/2013 | Liu | G03B 5/00 396/55 |
| 2014/0125825 | A1* | 5/2014 | Baer | G06T 3/4053 348/208.5 |
| 2015/0103194 | A1* | 4/2015 | Takeuchi | H04N 5/23258 348/208.6 |
| 2015/0160469 | A1* | 6/2015 | Wakamatsu | H04N 5/23258 348/208.11 |
| 2015/0198783 | A1 | 7/2015 | Shimotsu | |
| 2015/0198818 | A1* | 7/2015 | Miyasako | G02B 27/646 359/557 |
| 2015/0301353 | A1* | 10/2015 | Takeuchi | H04N 5/23283 359/554 |
| 2016/0154204 | A1* | 6/2016 | Lim | G02B 27/646 359/557 |
| 2016/0219222 | A1* | 7/2016 | Heo | H04N 5/23287 |
| 2016/0227090 | A1* | 8/2016 | Krey | H04N 5/23287 |
| 2016/0227118 | A1* | 8/2016 | Krey | H04N 5/23258 |
| 2016/0227119 | A1* | 8/2016 | Krey | H04N 5/23258 |
| 2016/0246029 | A1* | 8/2016 | Kim | G02B 7/08 |
| 2016/0269644 | A1* | 9/2016 | Cheong | G02B 7/028 |
| 2017/0094181 | A1* | 3/2017 | Miller | H04N 5/23287 |
| 2017/0358101 | A1* | 12/2017 | Bishop | H04N 13/239 |
| 2018/0149881 | A1* | 5/2018 | Kim | G02B 7/09 |
| 2018/0184005 | A1* | 6/2018 | Morotomi | H04N 5/23258 |
| 2019/0162562 | A1* | 5/2019 | Min | G01D 5/2033 |
| 2019/0204531 | A1 | 7/2019 | Sugawara | G02B 27/646 |
| 2020/0050013 | A1* | 2/2020 | Rhee | G03B 5/02 |
| 2020/0052621 | A1* | 2/2020 | Yu | G03B 13/36 |
| 2020/0120238 | A1* | 4/2020 | Kim | H04N 5/2253 |
| 2020/0120279 | A1* | 4/2020 | Min | H04N 5/23287 |

* cited by examiner

CAMERA MODULE AND PORTABLE ELECTRONIC DEVICE

CROSS-REFERENCE TO RELATED APPLICATIONS

This application claims the benefit under 35 U.S.C. 119(a) of Korean Patent Application No. 10-2018-0121709 filed on Oct. 12, 2018, in the Korean Intellectual Property Office, the entire disclosure of which is incorporated herein by reference for all purposes.

BACKGROUND

1. Field

The present disclosure relates to a camera module and a portable electronic device.

2. Description of the Background

For some time, a portable communications terminal such as a cellular phone, a personal digital assistant (PDA), or a portable personal computer (PC), has generally been implemented with the capability to transmit video data, as well as text or audio data. In accordance with this trend, a camera module has become a standard feature in portable communications terminals to enable the transmission of the video data, video chatting, and other functions involving the transmission of video data.

Generally, a camera module includes a lens barrel having lenses disposed therein, a housing accommodating the lens barrel therein, and an image sensor converting an image of a subject into an electrical signal. A fixed-focus type camera module capturing an image of an object using a fixed focus may be used as the camera module. However, as camera module technology has developed, a camera module including an actuator capable of autofocusing (AF) has recently been used. In addition, the camera module may include an actuator for optical image stabilization (OIS) to suppress a decrease in resolution due to a hand-shake of a user at the time of capturing an image or a moving picture.

In addition, as a majority of electronic devices implemented with a camera module are getting thinner in dimension, recently, the camera module has been required to be smaller in size.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a gyro sensor configured to generate a gyro signal, an optical image stabilization (OIS) controller configured to generate, in response to the gyro signal, a driving signal indicating target positions in first and second directions perpendicular to an optical axis of a lens barrel, a first OIS driver configured to detect a present position of the lens barrel in the first direction, and based on the detected present position in the first direction and the indicated target position in the first direction, provide a driving force to the lens barrel in the first direction, and a second OIS driver configured to detect a present position of the lens barrel in the second direction, and based on the detected present position in the second direction and the indicated target position in the second direction, provide a driving force to the lens barrel in the second direction.

The OIS controller may include a memory having a stored OIS algorithm, and a processor configured to calculate the target position of the lens barrel in the first direction and the target position of the lens barrel in the second direction, according to the OIS algorithm.

The OIS controller may be connected to the first OIS driver and the second OIS driver through a single port.

The OIS controller may be connected to the first OIS driver and the second OIS driver through an inter-integrated circuit (I2C) communication line.

The OIS controller may sequentially provide the driving signal to the first OIS driver and the second OIS driver.

The first OIS driver and the second OIS driver may each include a position sensor configured to generate a feedback signal by detecting a present position of the lens barrel, a control signal generation unit configured to generate a control signal in response to the driving signal and the feedback signal, and a driving circuit configured to generate a driving current in response to the control signal.

The position sensor may include a hall element configured to detect the present position of the lens barrel.

A portable electronic device may include the camera module further having an image sensor configured to convert light incident through the lens barrel to an electric signal, and a display unit disposed on a surface of the portable electronic device to display an image based on the electric signal.

In another general aspect, a camera module includes a lens barrel, a first optical image stabilization (OIS) magnet and a second OIS magnet, wherein the first OIS magnet is disposed on a side of the lens barrel in a first direction perpendicular to an optical axis, and the second OIS magnet is disposed on a side of the lens barrel in a second direction perpendicular to the optical axis, a first OIS coil and a second OIS coil, wherein the first OIS coil is disposed opposite to the first OIS magnet, and the second OIS coil is disposed opposite to the second OIS magnet, an OIS controller configured to generate a driving signal indicating a target position of the lens barrel in the first direction and a target position of the lens barrel in the second direction, and a first OIS driver and a second OIS driver, wherein the first OIS driver provides a driving current to the first OIS coil based on the indicated target position in the first direction, and the second OIS driver provides a driving current to the second OIS coil based on the indicated target position in the second direction, wherein the first OIS driver is disposed in a hollow portion of the first OIS coil, and the second OIS driver is disposed in a hollow portion of the second OIS coil.

The first OIS driver and the second OIS driver may each include a position sensor configured to detect a present position of the lens barrel and generate a feedback signal based on the detected present position, a control signal generation unit configured to generate a control signal based on the driving signal and the feedback signal, and a driving circuit configured to generate a driving current in response to the control signal.

The control signal generation unit may generate the control signal based on an offset value calculated by comparing the driving signal and the feedback signal.

The control signal generation unit may apply a control gain to the offset value and generate the control signal.

The camera module may be a portable electronic device, further including an image sensor configured to convert light incident through the lens barrel to an electric signal, and a display unit disposed on a surface of the portable electronic device to display an image based on the electric signal.

In another general aspect, a portable electronic device includes a lens barrel configured to refract light on an image sensor to generate an electric signal, a display unit configured to display an image in response to the electric signal, an optical image stabilization (OIS) controller configured to generate a driving signal based on an indicated target position of the lens barrel in first and second directions perpendicular to an optical axis of the lens barrel, an OIS driver configured to generate a feedback signal based on a present position of the lens barrel in the first and second directions, and a driving circuit configured to drive the lens barrel in the first and second directions in response to the driving signal and the feedback signal.

The lens barrel may include a plurality of lens barrels, the OIS driver may include a first OIS driver and a second OIS driver for each lens barrel of two or more lens barrels of the plurality of lens barrels, and a number of OIS controller to a number of first and second OIS drivers is one to four or one to greater than four.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

An aspect of the present disclosure is to provide a portable electronic device and a camera module which can be reduced in size by partitioning an integrated circuit performing an optical image stabilization (OIS) function.

Figure 1:
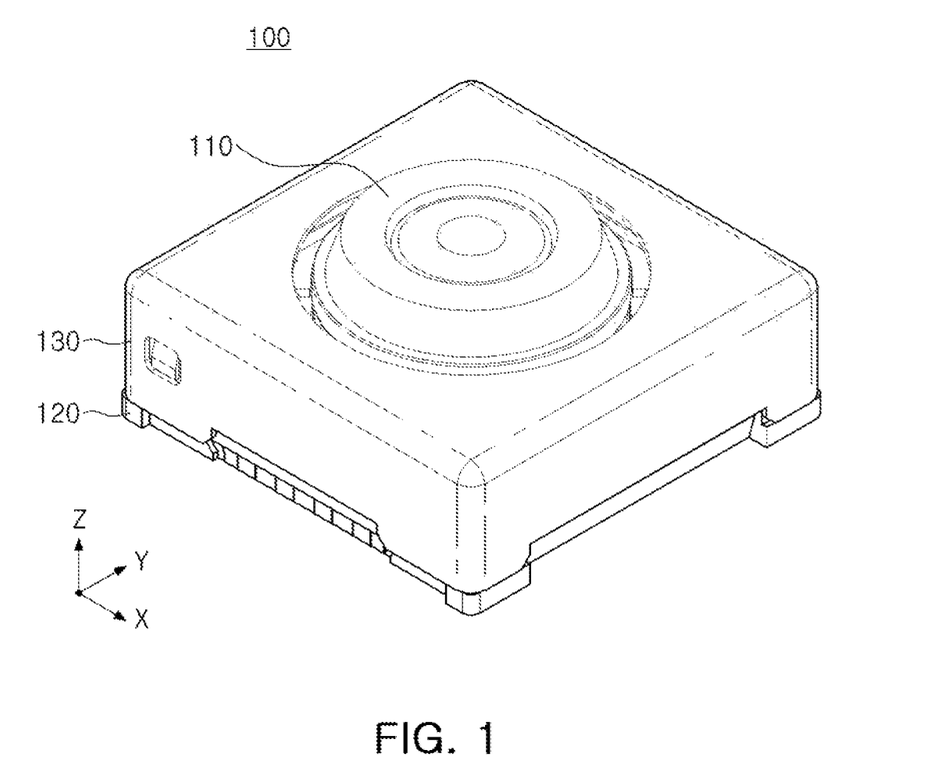
FIG. 1 is a perspective view of a camera module of one or more example embodiments.

FIG. 1 is a perspective view of a camera module according to one or more example embodiments described herein.

Referring to FIG. 1, a camera module 100 according to the examples described herein includes a lens barrel 110, a housing 120 accommodating the lens barrel 110 therein, and a case 130 coupled to the housing 120.

The lens barrel 110 may be in the shape of a hollow cylinder capable of accommodating therein a plurality of lenses capturing an image of a subject, and the plurality of lenses mounted in the lens barrel 110 along an optical axis. A number of lenses, being one or more, mounted in the lens barrel 110, may vary based on a target specification of the lens barrel 110. The lenses may have optical characteristics, such as the same refractive index or different refractive indices, and the like.

Figure 7A:
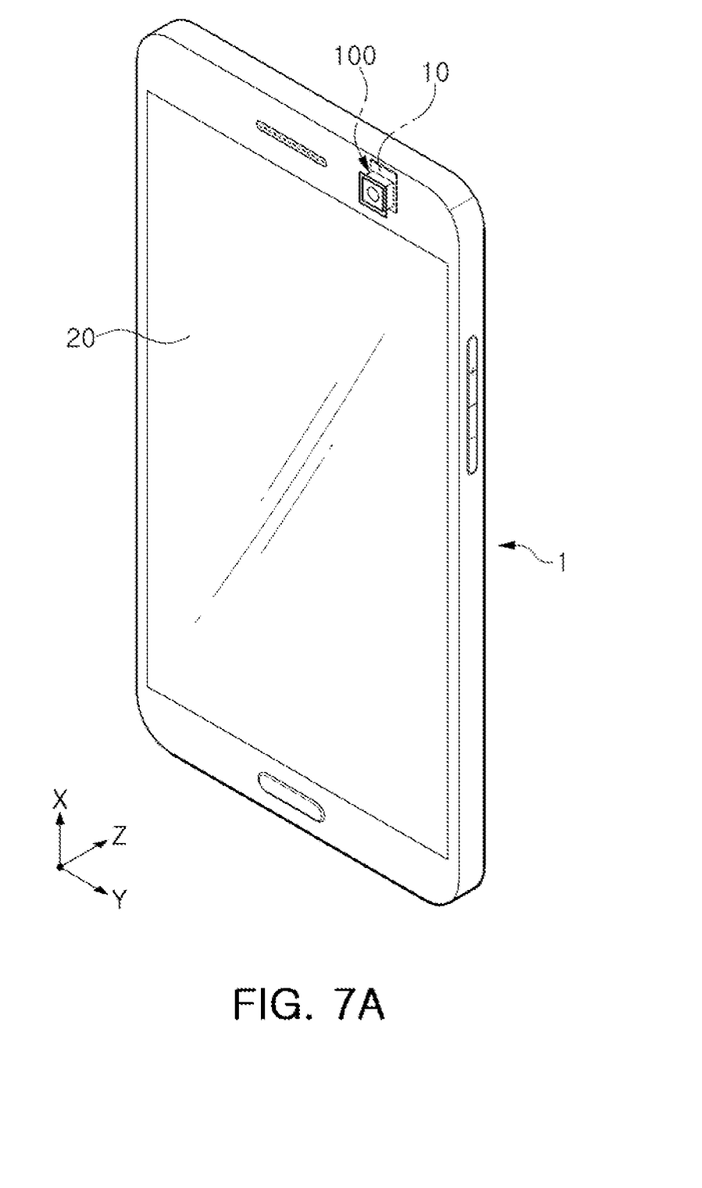
FIG. 7A and FIG. 7B are perspective views illustrating one or more examples of a camera module portable electronic device.
Figure 7B:
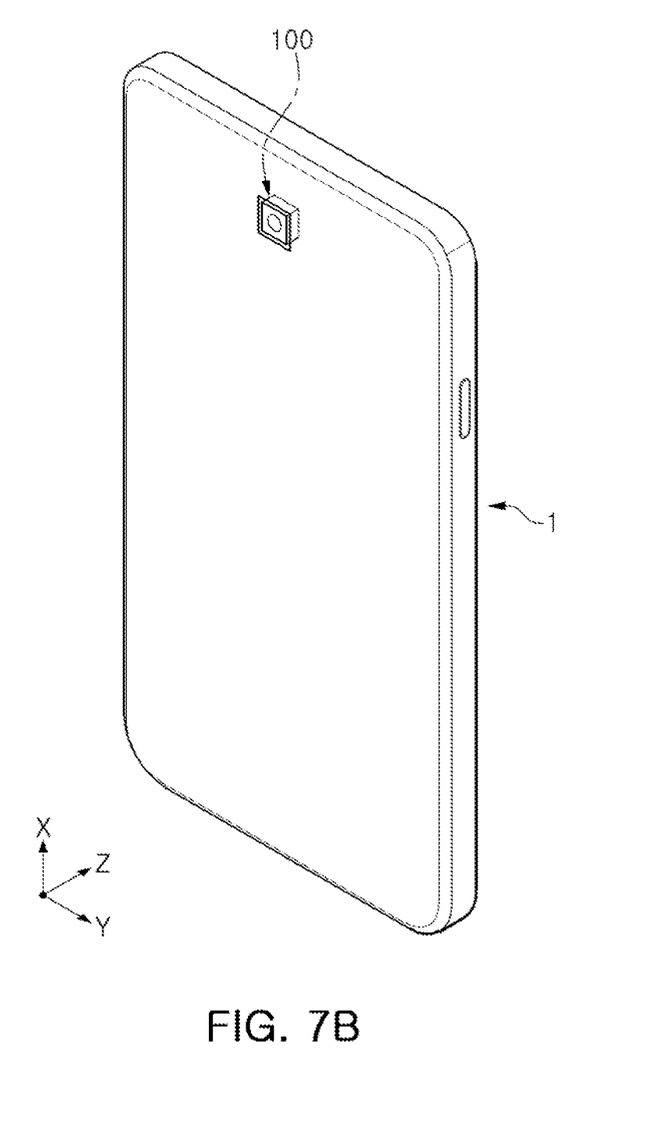

The camera module 100 may further include an image sensor 10 configured to convert light entered through the lens barrel 110 into an electric signal (FIG. 7A). The image sensor 10 can convert light entered through the lens barrel 110 into an electric signal. The image sensor 10 may include a charge coupled device (CCD) or a complementary metal-oxide semiconductor (CMOS). The electric signal converted by the image sensor 10 is output as an image through a display unit 20 of a portable electronic device 1 (FIGS. 7A and 7B). The image sensor 10 is affixed to a printed circuit board and electrically connected to the printed circuit board by wire bonding. The portable electronic device may be, for example, a portable communications terminal such as a cellular phone, a personal digital assistant (PDA), a portable personal computer (PC), and the like.

An infrared filter may be provided in an upper part of an image sensor. The infrared filter filters infrared light from the light entered through the lens barrel 110.

The lens barrel 110 and an actuator may be accommodated in the housing 120. For example, the housing 120 has an open top and an open bottom, and the lens barrel 110 and the actuator are accommodated in an inner space of the housing 120. In a lower part of the housing 120, the image sensor module may be disposed. The case 130 is coupled to the housing 120 so as to surround an external surface of the housing 120 to protect internal components of the camera module 100. Also, the case 130 serves to prevent electromagnetic waves generated by the camera module inside the portable electronic device from influencing other electronic components disposed therein. Also, since there are various electronic components, other than the camera module, mounted in the portable electronic device, the case 130 can prevent electromagnetic waves generated by these other electronic components from influencing the camera module.

The camera module may further include the actuator configured to move the lens barrel 110 in directions perpendicular to the optical axis. For example, the actuator may move the lens barrel 110 in an optical axis direction—a Z axis direction—thereby adjusting focus, and may move the lens barrel 110 in directions perpendicular to the optical axis, thereby correcting a shake when capturing an image. The actuator includes a focus adjustment unit configured to adjust focus and a shake correction unit configured to correct a shake.

Figure 2:
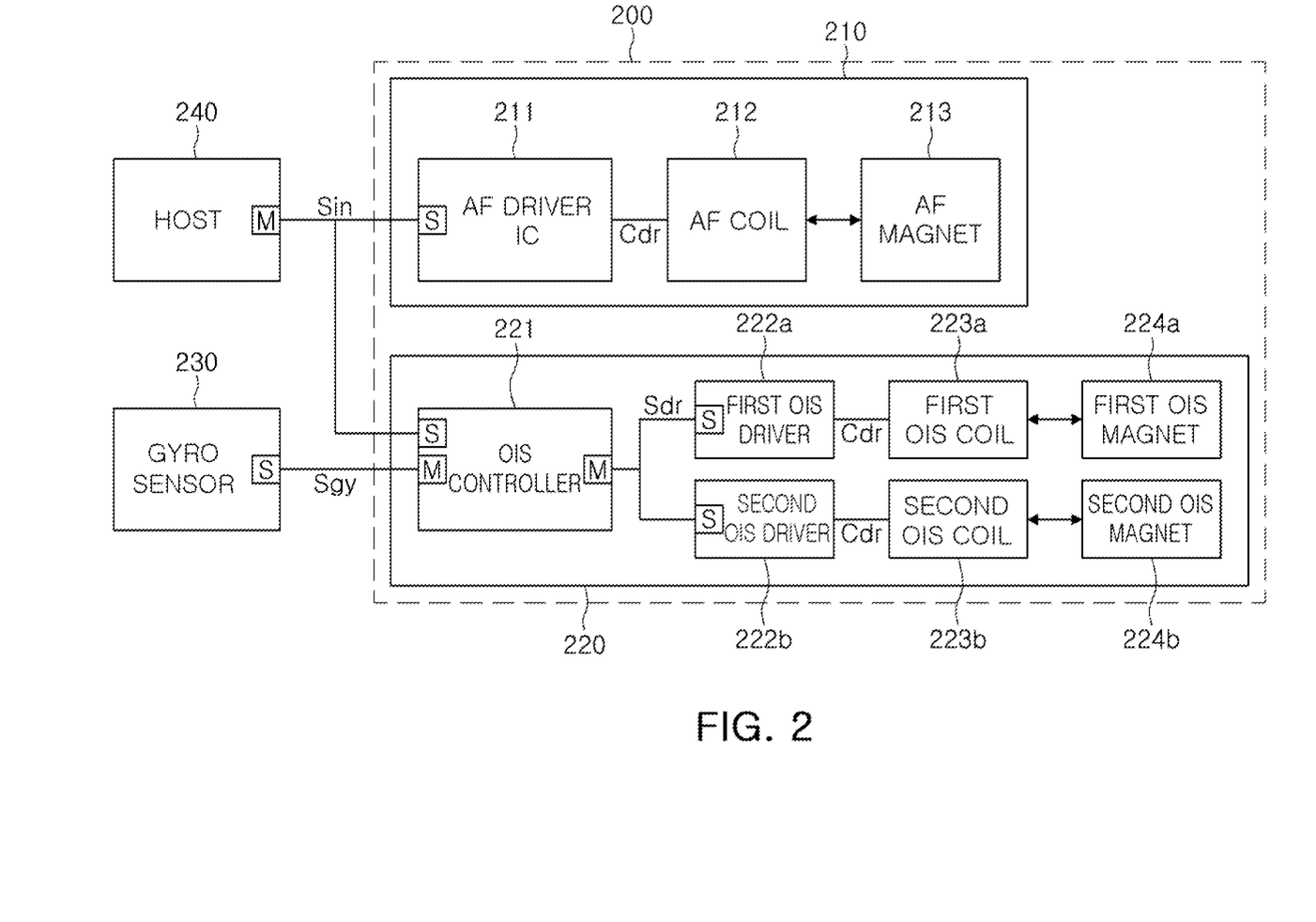
FIG. 2 is a block diagram of an actuator of a camera module according to one or more example embodiments.

FIG. 2 is a block diagram of an actuator of a camera module according to one or more example embodiments described herein.

Referring to FIG. 2, an actuator 200 of a camera module according to the examples described herein may include a focus adjustment unit 210 and a shake correction unit 220.

The focus adjustment unit 210 may be connected to a host 240, and the shake correction unit 220 may be connected to a gyro sensor 230 and the host 240.

The gyro sensor 230 may be disposed inside a camera module or inside an electronic device including the camera module. The gyro sensor 230 detects a shake of the camera module or the electronic device, and provides a gyro signal Sgy containing acceleration data and angular velocity data of the shake, to an OIS controller 221 of the shake correction unit 220.

The gyro sensor 230 may be connected to the OIS controller 221 of the shake correction unit 220 through a communication line. For example, the gyro sensor 230 may be connected to the OIS controller 221 of the shake correction unit 220 through a serial interface line, for example, a serial peripheral interface (SPI) bus.

The OIS controller 221 is operated as a master device of SPI communications, and the gyro sensor 230 is operated as a slave device of SPI communications. Accordingly, a master port M is disposed in the OIS controller 221, and a slave port S is disposed in the gyro sensor 230. The OIS controller 221 can periodically read the gyro signal Sgy from the gyro sensor 230.

The host 240 may be disposed within an electronic device including the camera module, to control an overall operation of the electronic device.

The host 240 may be connected to an AF driver 211 of the focus adjustment unit 210 and to the OIS controller 221 of the shake correction unit 220 through communication lines. For example, the host 240 may be connected to the AF driver 211 of the focus adjustment unit 210 and the OIS controller 221 of the shake correction unit 220 through a serial interface line, more particularly, an I2C communication line.

The host 240 is operated as a master device of I2C communications, and the AF driver 211 and the OIS controller 221 are each operated as a slave device of I2C communications. Accordingly, a master port M is disposed in the host 240, and a slave port S is disposed in each of the AF driver 211 and the OIS controller 221.

The host 240 provides input signals Sin to the AF driver 211 and the OIS controller 221. An input signal Sin provided to the AF driver 211 contains information on a target position of the lens barrel 110. Also, an input signal Sin provided to the OIS controller 221 contains a command for performing a shake correction function. For example, the OIS controller 221, when provided with an input signal Sin from the host 240, can initiate a shake correction operation.

Referring to FIG. 1 and FIG. 2, an operation scheme of an actuator according to one or more example embodiments will be described in greater detail hereinbelow.

The focus adjustment unit 210 may include the AF driver 211, an AF coil 212, and an AF magnet 213.

The AF driver 211 may generate a driving current Cdr in response to the input signal Sin provided from the host 240 and provide the generated driving current Cdr to the AF coil 212. Once the driving current Cdr is applied to the AF coil 212, the lens barrel 110 may move in the optical axis direction due to an electromagnetic influence between the AF magnet 213 and the AF coil 212. For example, the AF magnet 213 may be mounted on one side of the lens barrel 110, and the AF coil 212 may be mounted on the housing 120, opposing the AF magnet 213. However, in some example embodiments, the position of the AF magnet 213 may be swapped with the position of the AF coil 212.

The shake correction unit 220 includes the OIS controller 221, a first OIS driver 222a, a second OIS driver 222b, a first OIS coil 223a, a second OIS coil 223b, a first OIS magnet 224a, and a second OIS magnet 224b.

The OIS controller 221 generates a driving signal Sdr in response to an input signal Sin provided from the host 240 and a gyro signal Sgy provided from the gyro sensor 230. The OIS controller 221 calculates a target position of the first OIS magnet 224a and a target position of the second OIS magnet 224b according to acceleration data and angular velocity data contained in the gyro signal Sgy. The target position of the first OIS magnet 224a and the target position of the second OIS magnet 224b, thus calculated, are contained in the driving signal Sdr and provided to the first OIS driver 222a and the second OIS driver 222b.

The OIS controller 221 may be connected to the first OIS driver 222a and the second OIS driver 222b through communication lines. For example, the OIS controller 221 may be connected to the first OIS driver 222a and the second OIS driver 222b through a serial interface line, more particularly, an 120 communication line.

The OIS controller 221 is operated as a master device of I2C communications, and the first OIS driver 222a and the second OIS driver 222b are each operated as a slave device of I2C communications. Accordingly, a master port M is disposed in the OIS controller 221, and a slave port S is disposed in each of the first OIS driver 222a and the second OIS driver 222b. A single master port M disposed in the OIS controller 221 is connected to the slave ports S disposed in the first OIS driver 222a and the second OIS driver 222b, respectively.

Figure 3:
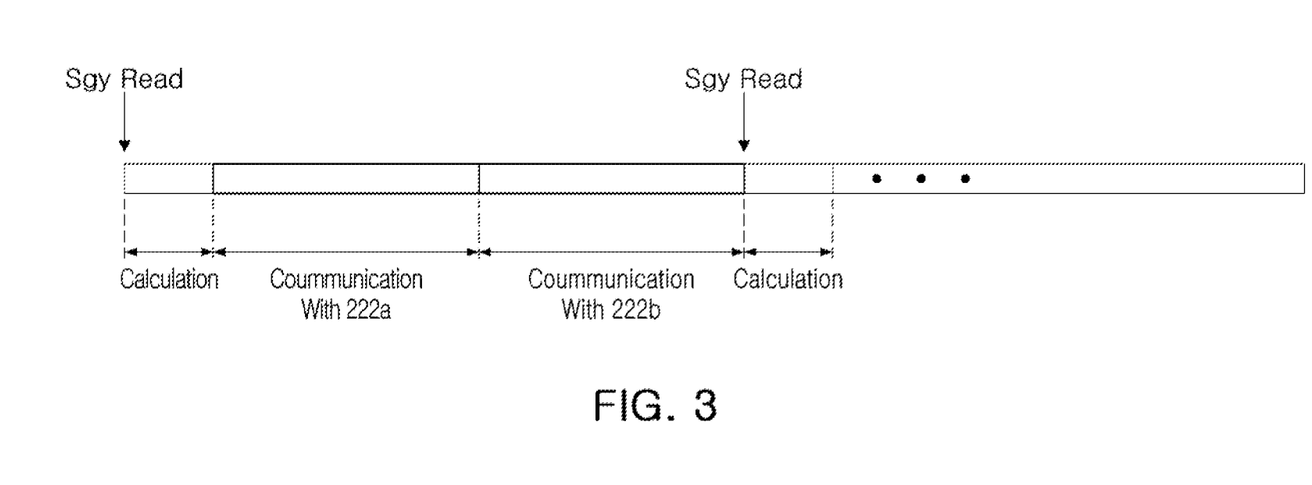
FIG. 3 is an operation timing diagram of an OIS controller according to one or more example embodiments.

FIG. 3 is an operation timing diagram for an OIS controller according to an example embodiment of the present disclosure.

Referring to FIG. 3, the OIS controller 221 periodically reads gyro signals from the gyro sensor 230, shown in FIG. 3 as Sgy Read, and according to acceleration data and angular velocity data contained in the read gyro signals, calculates a target position of the first OIS magnet 224a and a target position of the second OIS magnet 224b, shown in FIG. 3 as Calculation. The driving signals Sdr, containing information on the calculated target positions, by sequential communications with the first OIS driver 222a and with the second OIS driver 222b, may be sequentially provided to the first OIS driver 222a and the second OIS driver 222b.

Referring to FIG. 2, the first OIS driver 222a generates a driving current Cdr in response to a driving signal Sdr indicating a target position of the lens barrel 110 in a first direction—an X axis direction—and a feedback signal corresponding to a present position of the lens barrel 110 in the first direction, and may provide the generated driving current Cdr to the first OIS coil 223a. When the driving current Cdr is applied to the first OIS coil 223a, the lens barrel 110 may move in the first direction, perpendicular to the optical axis, due to an electromagnetic influence between the first OIS magnet 224a and the first OIS coil 223a.

For example, the first OIS magnet 224a may be mounted on a side surface of the lens barrel 110 in the first direction, and the first OIS coil 223a may be mounted on the housing 120, opposing the first OIS magnet 224a. However, in some example embodiments, the position of the first OIS magnet 224a may be swapped with the position of the first OIS coil 223a.

The second OIS driver 222b may generate a driving current Cdr in response to a driving signal Sdr indicating a target position of the lens barrel 110 in a second direction—a Y axis direction—and a feedback signal corresponding to a present position of the lens barrel 110 in the second direction, and may provide the generated driving current Cdr to the second OIS coil 223b. When the driving current Cdr is applied to the second OIS coil 223b, the lens barrel 110 may move in the second direction, perpendicular to the optical axis, due to an electromagnetic influence between the second OIS magnet 224b and the second OIS coil 223b.

For example, the second OIS magnet 224b may be mounted on a side surface of the lens barrel 110 in the second direction, and the second OIS coil 223b may be mounted on the housing 120, opposing the second OIS magnet 224b. However, in some example embodiments, the position of the second OIS magnet 224b may be swapped with the position of the second OIS coil 223b.

In the example embodiments described above, the actuator of the camera module is described as including the AF coil 212, the AF magnet 213, the first OIS coil 223a, the second OIS coil 223b, the first OIS magnet 224a, and the second OIS magnet 224b. However, depending on an operation scheme, the actuator may utilize a shape-memory alloy (SMA) instead of coils and magnets, to drive the lens barrel. Hereinbelow, the actuator of the camera module, including coils and magnets, will be described for convenience of description.

Figure 4:
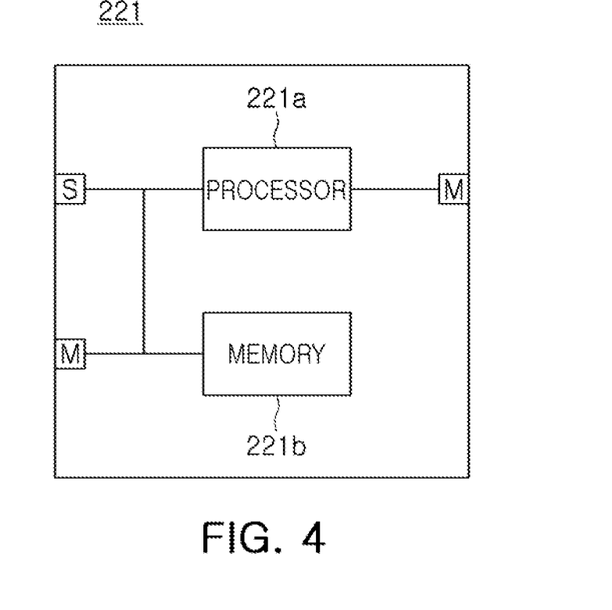
FIG. 4 is a block diagram of an OIS controller according to one or more example embodiments.

FIG. 4 is a block diagram of an OIS controller according to one or more example embodiments as described herein.

Referring to FIG. 4, an OIS controller 221 according to an example may include a processor 221a and a memory 221b. The processor 221a processes an input signal Sin provided from a host 240 and a gyro signal Sgy provided from a gyro sensor 230, to generate a driving signal Sdr.

The memory 221b may store a shake correction algorithm. According to the shake correction algorithm stored in the memory 221b, the processor 221a processes the input signal Sin and the gyro signal Sgy, and calculates a target position of a lens barrel 110 in the first direction and a target position of the lens barrel 110 in the second direction. Also, the driving signal Sdr generated according to the shake correction algorithm is provided to the first OIS driver 222a and the second OIS driver 222b.

Figure 5:
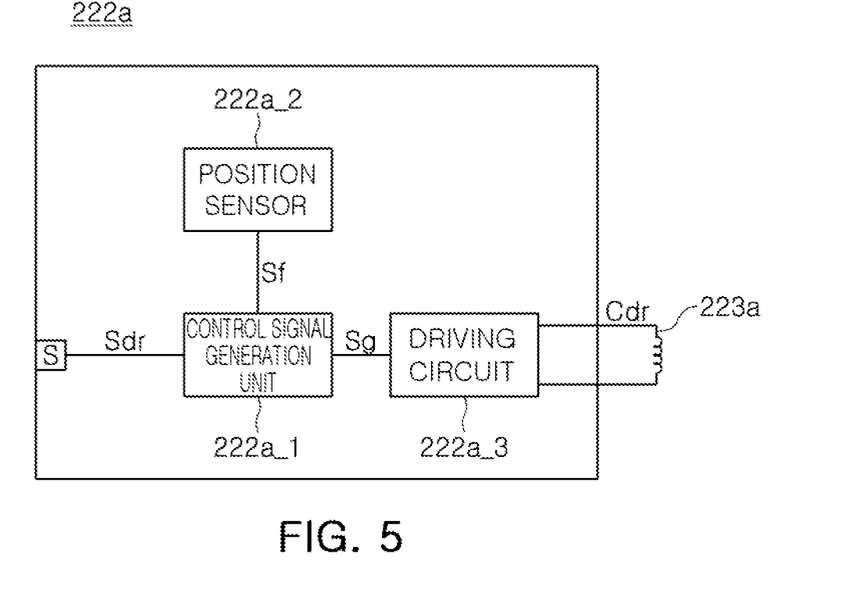
FIG. 5 is a block diagram of an OIS driver according to one or more example embodiments.

FIG. 5 is a block diagram of an OIS driver according to one or more example embodiments as described herein.

Although FIG. 5 illustrates the first OIS driver 222a as an example of the OIS driver, the following description can be similarly applied to the second OIS driver 222b.

Referring to FIG. 5, the first OIS driver 222a according to an example, may include a control signal generation unit 222a_1, a position sensor 222a_2, and a driving circuit 222a_3.

The control signal generation unit 222a_1 generates a control signal Sg according to a driving signal Sdr provided from the OIS controller 221 and a feedback signal Sf provided from the position sensor 222a_2, and based on the generated control signal Sg, controls the driving circuit 222a_3, thereby providing a driving current Cdr to the first OIS coil 223a.

For example, the control signal generation unit 222a_1 may compare the driving signal Sdr with the feedback signal Sf. The control signal generation unit 222a_1 compares a target position of a first OIS magnet 224a contained in the driving signal Sdr, to a present position of the first OIS magnet 224a contained in the feedback signal Sf, to calculate an offset value. A travel distance of the first OIS magnet 224a may be determined by the calculated offset value.

The control signal generation unit 222a_1 applies a control gain to the offset value to generate a control signal Sg. For example, the control signal generation unit 222a_1 may include a proportional-integral-derivative (PID) controller to perform a PID-type control. The control signal generation unit 222a_1 may perform a proportional control proportional to the size of a present offset value, and an integral control to reduce steady-state offsets, and a differential control to prevent abrupt changes and thereby reduce overshooting.

That is, the control signal generation unit 222a_1 may be operated in a closed-loop type, which compares a driving signal Sdr with a feedback signal Sf. The closed-loop type control signal generation unit 222a_1 may be operated in a direction toward reducing offsets between the target position of the first OIS magnet 224a contained in the driving signal Sdr and the present position of the first OIS magnet 224a contained in the feedback signal Sf. The closed-loop type control demonstrates improved linearity, accuracy, and repeatability as compared to an open-loop control.

The position sensor 222a_2 detects a present position of the lens barrel 110, and provides a feedback signal Sf indicating the detected present position to the control signal generation unit 222a_1.

In some examples, the position sensor 222a_2 may include a hall element detecting a displacement of a detection target unit provided on one side of the lens barrel 110. The hall element, by detecting a displacement of the detection target unit formed of magnetic or conductive material, can detect a position of the lens barrel 110. Also, the position sensor 222a_2 may include an amplifier configured to amplify an output signal of the hall element and a digital conversion unit configured to subject the amplified output signal to digital conversion and generate a feedback signal.

In some examples, the position sensor 222a_2 may include a passive component disposed on one side of the first OIS coil 223a, and may detect a present position of the lens barrel 110 based on a change in inherent properties of the passive component.

Also, in some examples, when the actuator of the camera module utilizes a shape-memory alloy (SMA), a present position of the lens barrel 110 may be detected based on a change in resistance of the SMA.

The driving circuit 222a_3 may include an H-bridge circuit capable of operation in both directions by a control signal Sg, and may apply a driving current Cdr to the first OIS coil 223a. The H-bridge circuit may include a plurality of transistors connected to both ends of the first OIS coil 223a in an H-bridge shape. When the driving circuit 222a_3 is operated in a voice coil motor mode, the control signal Sg provided from the control signal generation unit 222a_1 may be transferred to a gate of a transistor provided in the H-bridge circuit.

According to one or more examples described herein, an integrated circuit may be manufactured separating the OIS controller 221, the first OIS driver 222a, and the second OIS driver 222b of the shake correction unit 220, and thus, the size of the integrated circuit can be reduced. For example, the first OIS driver 222a may be provided in a hollow portion of the first OIS coil 223a, and the second OIS driver 222b may be provided in a hollow portion of the second OIS coil 223b. In addition, the OIS controller 221 may be provided in one or more other locations such as on an external side of a coil. Accordingly, when the OIS controller 221, the first OIS driver 222a, and the second OIS driver 222b are fabricated as a single integrated circuit, the camera module may not require the use of an additional substrate, and thus can be manufactured with a reduced size.

Figure 6:
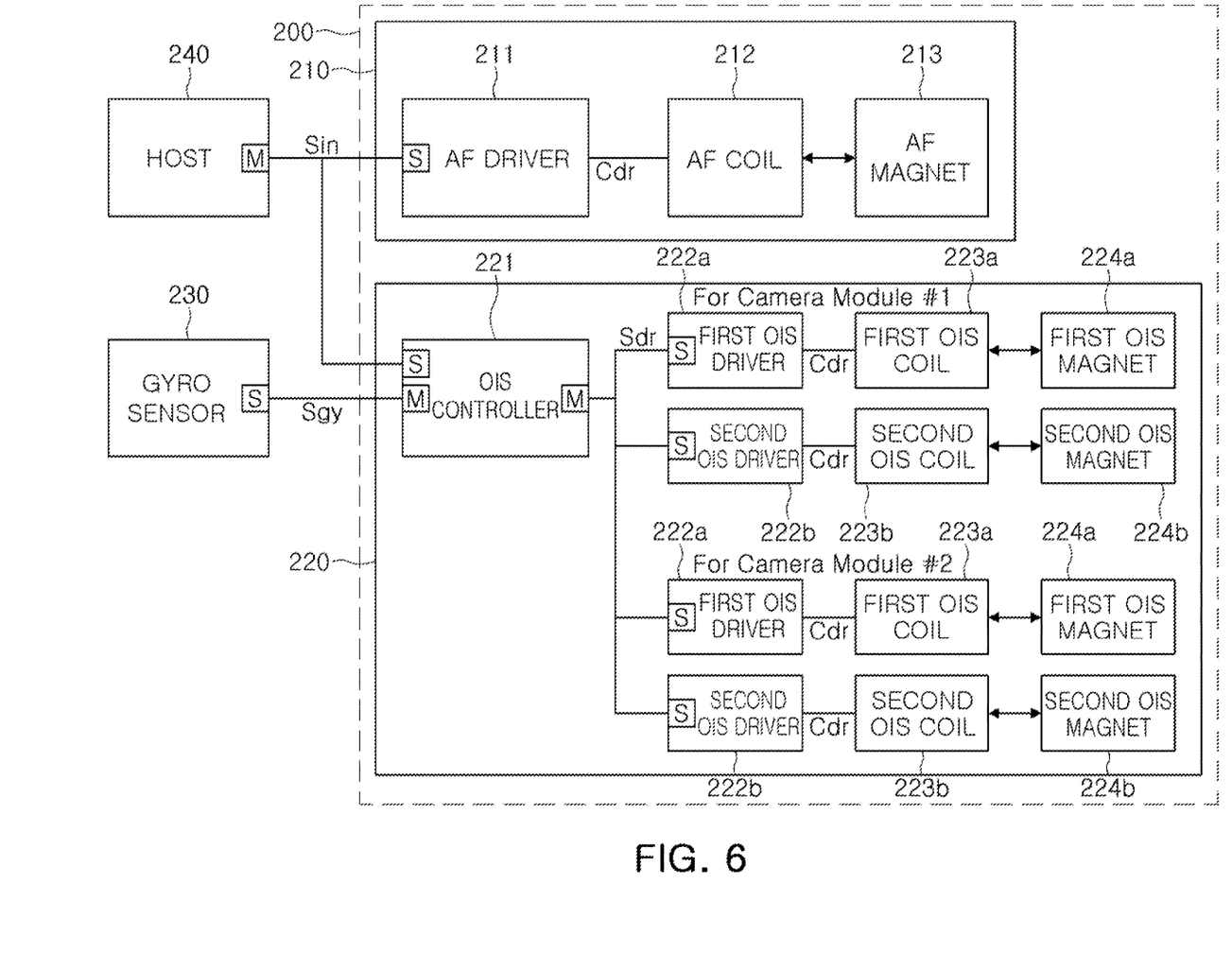
FIG. 6 is an actuator of a camera module according to one or more other example embodiments.

FIG. 6 illustrates an actuator of a camera module according to one or more other example embodiments as described herein.

Since the actuator according to the example of FIG. 6 is similar to the actuator according to the example of FIG. 2, the following description will be provided with an emphasis placed on features different from the example of FIG. 2.

Comparing the actuator of FIG. 6 to the actuator of FIG. 2, although the actuator of FIG. 2 is illustrated as having two OIS drivers to operate a single camera module, the actuator illustrated in FIG. 6 includes four OIS drivers to operate two camera modules Camera Module #1 and Camera Module #2. That is, an actuator of a camera module illustrated in FIG. 6 can be understood as being an actuator applicable to a dual camera module.

Referring to FIG. 6, in the actuator for a dual camera module according to one or more examples, the first OIS driver 222a and the second OIS driver 222b, provided in each of two camera modules Camera Module #1 and Camera Module #2, are connected to a single OIS controller 221, and thus, the manufacturing costs of the OIS controller 221 can be reduced.

Referring to FIGS. 7A and 7B, the camera module 100, according to the examples described herein, may be a mobile device, such as a portable electronic device 1, and further include a display unit 20, wherein the camera module 100 is installed as a front camera of the portable electronic device 1 along with the display unit 20 or as a back camera on a side of the portable electronic device 1 other than a side with the display unit 20. As described in the various examples, an electrical signal converted by an image sensor 10 of the camera module 100 may be output as an image via the display unit 20 of the portable electronic device 1.

According to the examples described herein, a camera module can be reduced in size by partitioning an integrated circuit performing an OIS function. According to the examples described above, the portable electronic device can be reduced in size as well.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of this disclosure is defined not by the detailed description, but by the claims and their equivalents, and all variations within the scope of the claims and their equivalents are to be construed as being included in this disclosure.

What is claimed is:

1. A camera module, comprising:
   a gyro sensor configured to generate a gyro signal;
   an optical image stabilization (OIS) controller disposed on a first integrated circuit and configured to generate, in response to the gyro signal, a driving signal indicating target positions in first and second directions perpendicular to an optical axis of a lens barrel and to output the driving signal through a single master port;
   a first OIS driver disposed on a second integrated circuit separate from the first integrated circuit and configured to detect a present position of the lens barrel in the first direction, and based on the detected present position in the first direction and the indicated target position in the first direction, provide a driving force to drive the lens barrel in the first direction; and
   a second OIS driver disposed on a third integrated circuit separate from the first and second integrated circuits and configured to detect a present position of the lens barrel in the second direction, and based on the detected present position in the second direction and the indicated target position in the second direction, provide a driving force to drive the lens barrel in the second direction,
   wherein the first OIS driver and the second OIS driver are configured as slaves to the OIS controller such that the first OIS driver and the second OIS driver are configured to access the OIS controller through the master port.

2. The camera module of claim 1, wherein the OIS controller comprises:
   a memory comprising a stored OIS algorithm; and
   a processor configured to calculate the target position of the lens barrel in the first direction and the target position of the lens barrel in the second direction, according to the OIS algorithm.

3. The camera module of claim 1, wherein the first OIS driver and the second OIS driver each comprise:
   a position sensor configured to generate a feedback signal by detecting a present position of the lens barrel;
   a control signal generation unit configured to generate a control signal in response to the driving signal and the feedback signal; and
   a driving circuit configured to generate a driving current in response to the control signal.

4. The camera module of claim 3, wherein the position sensor comprises a hall element configured to detect the present position of the lens barrel.

5. A portable electronic device, comprising:
   the camera module of claim 1 further comprising an image sensor configured to convert light incident through the lens barrel to an electric signal; and
   a display unit disposed on a surface of the portable electronic device to display an image based on the electric signal.

6. The camera module of claim 1, wherein the OIS controller is connected to the first OIS driver and the second OIS driver through an inter-integrated circuit (I2C) communication line.

7. The camera module of claim 1, wherein the OIS controller sequentially provides the driving signal to the first OIS driver and the second OIS driver.

8. A camera module, comprising:
   a lens barrel;
   a first optical image stabilization (OIS) magnet and a second OIS magnet, wherein the first OIS magnet is disposed on a side of the lens barrel in a first direction perpendicular to an optical axis, and the second OIS magnet is disposed on a side of the lens barrel in a second direction perpendicular to the optical axis;
   a first OIS coil and a second OIS coil, wherein the first OIS coil is disposed opposite to the first OIS magnet, and the second OIS coil is disposed opposite to the second OIS magnet;
   an OIS controller disposed on a first integrated circuit and configured to generate a driving signal indicating a target position of the lens barrel in the first direction and a target position of the lens barrel in the second direction and to output the driving signal through a single master port; and
   a first OIS driver disposed on a second integrated circuit separate from the first integrated circuit and a second OIS driver disposed on a third integrated circuit separate from the first and second integrated circuits, wherein the first OIS driver provides a driving current to the first OIS coil based on the indicated target position in the first direction, and the second OIS driver provides a driving current to the second OIS coil based on the indicated target position in the second direction,
   wherein the first OIS driver is disposed in a hollow portion of the first OIS coil, and the second OIS driver is disposed in a hollow portion of the second OIS coil, and
   wherein the first OIS driver and the second OIS driver are configured as slaves to the OIS controller such that the first OIS driver and the second OIS driver are configured to access the OIS controller through the master port.

9. The camera module of claim 8, wherein the OIS controller includes:
   a memory comprising a stored OIS algorithm; and
   a processor configured to calculate the target positions of the lens barrel in the first and second directions according to the OIS algorithm.

10. The camera module of claim 8, wherein the first OIS driver and the second OIS driver each comprise:
    a position sensor configured to detect a present position of the lens barrel and generate a feedback signal based on the detected present position;
    a control signal generation unit configured to generate a control signal based on the driving signal and the feedback signal; and
    a driving circuit configured to generate a driving current in response to the control signal.

11. The camera module of claim 10, wherein the position sensor comprises a hall element configured to detect the present position of the lens barrel.

12. The camera module of claim 10, wherein the control signal generation unit generates the control signal based on an offset value calculated by comparing the driving signal and the feedback signal.

13. The camera module of claim 12, wherein the control signal generation unit applies a control gain to the offset value and generates the control signal.

14. The camera module of claim 8, wherein the camera module is a portable electronic device, further comprising:
    an image sensor configured to convert light incident through the lens barrel to an electric signal; and
    a display unit disposed on a surface of the portable electronic device to display an image based on the electric signal.

15. The camera module of claim 8, wherein the OIS controller is connected to the first OIS driver and the second OIS driver through an inter-integrated circuit (I2C) communication line.

16. The camera module of claim 15, wherein the OIS controller sequentially provides the driving signal to the first OIS driver and the second OIS driver.

17. A portable electronic device, comprising:
- a lens barrel configured to refract light on an image sensor to generate an electric signal;
- a display unit configured to display an image in response to the electric signal;
- an optical image stabilization (OIS) controller disposed on a first integrated circuit and configured to generate a driving signal based on an indicated target position of the lens barrel in first and second directions perpendicular to an optical axis of the lens barrel and to output the driving signal through a single master port;
- an OIS driver disposed on a second integrated circuit separate from the first integrated circuit and configured to generate a feedback signal based on a present position of the lens barrel in the first and second directions, wherein the OIS driver is configured as a slave to the OIS controller such that the OIS driver is configured to access the OIS controller through the master port; and
- a driving circuit disposed on a third integrated circuit separate from the first and second integrated circuits and configured to drive the lens barrel in the first and second directions in response to the driving signal and the feedback signal.

18. The portable electronic device of claim 17, wherein the lens barrel comprises a plurality of lens barrels,
- wherein the OIS driver comprises a first OIS driver and a second OIS driver for each lens barrel of two or more lens barrels of the plurality of lens barrels, and
- wherein a number of OIS controller to a number of first and second OIS drivers is one to four or one to greater than four.

* * * * *